United States Patent [19]
Cochran et al.

[11] 3,838,755
[45] Oct. 1, 1974

[54] CONICAL SPRING DISK BRAKING MECHANISM

[75] Inventors: J. Richard Cochran; Ronald L. Altnau, both of Ripon, Wis.

[73] Assignee: McGraw-Edison Company, Ripon, Wis.

[22] Filed: Jan. 15, 1973

[21] Appl. No.: 323,763

[52] U.S. Cl................. 188/166, 68/23.6, 188/71.1, 188/72.1, 188/72.3
[51] Int. Cl............................................. B60t 13/04
[58] Field of Search ......... 188/166, 171, 72.3, 71.1, 188/72.1; 68/23, 23.6; 192/89 B, 70.27

[56] References Cited
UNITED STATES PATENTS

| | | | |
|---|---|---|---|
| 2,852,116 | 9/1958 | Spase | 192/89 B |
| 2,885,047 | 5/1959 | Kehrl | 192/70.27 X |
| 2,983,339 | 5/1961 | Neff | 188/72.3 X |
| 3,087,321 | 4/1963 | Brucken | 68/23.6 |
| 3,314,257 | 4/1967 | Fosler et al. | 68/23.6 X |
| 3,570,638 | 3/1971 | Baker | 192/89 B X |
| 3,630,333 | 12/1971 | Schiefer et al. | 192/89 B X |
| 3,735,843 | 5/1973 | Wiig | 188/166 X |
| 3,770,088 | 11/1973 | Shono | 192/89 B X |

Primary Examiner—Lloyd L. King
Assistant Examiner—Randolph A. Reese
Attorney, Agent, or Firm—Wolfe, Hubbard, Leydig, Voit & Osann, Ltd.

[57] ABSTRACT

A disk braking mechanism particularly adapted for use in a laundry machine or the like wherein a rotatable shaft is to be braked, the brake mechanism comprising a pair of generally flat circular plates adapted to be moved axially relative to one another to frictionally compress one or more stationary brake pads, one of the plates being fixed to the rotatable shaft. A conical spring is positioned adjacent the movable plate and is pivotable about an annular fulcrum between the inner and outer peripheries, the fulcrum being defined by a number of spacing means which secure the conical spring and movable plate to the plate fixed to the shaft. Deflecting the inner periphery of the conical spring causes its outer periphery to move away from the axially movable plate and thereby release the braking force applied to the brake pads positioned between the two plates. By permitting the inner periphery of the conical spring to return to its undeflected position, braking force will be reapplied to prevent rotation of the shaft.

12 Claims, 6 Drawing Figures

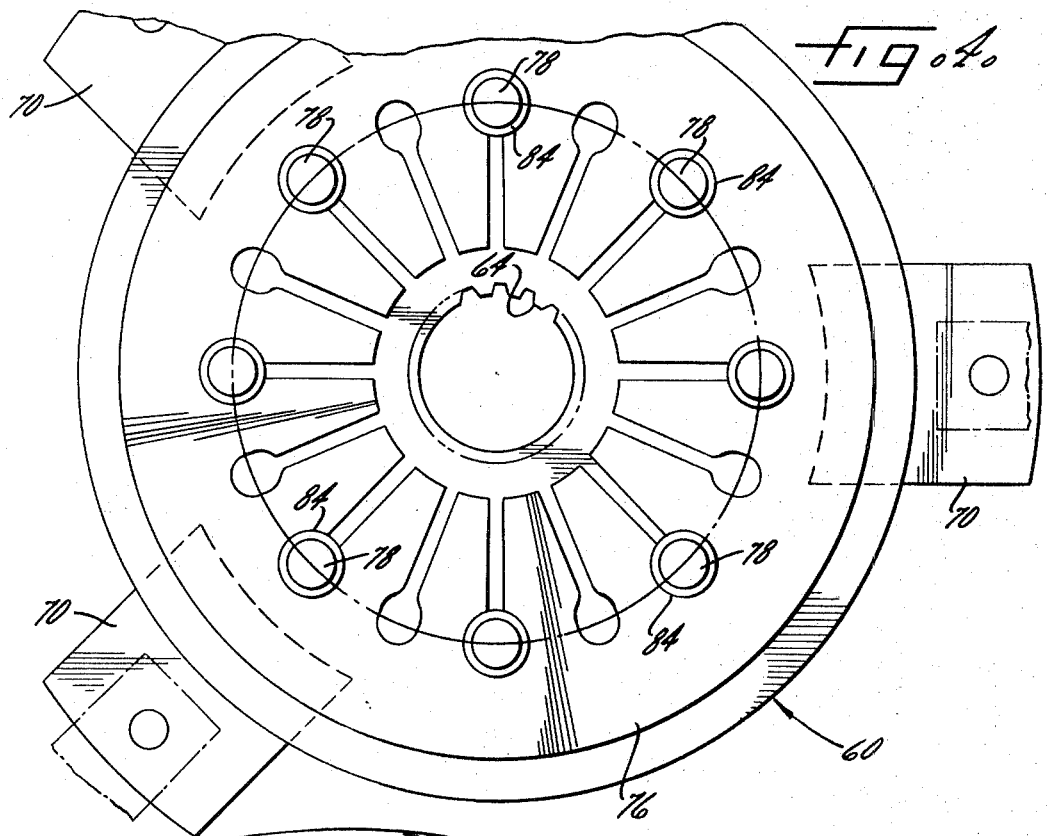
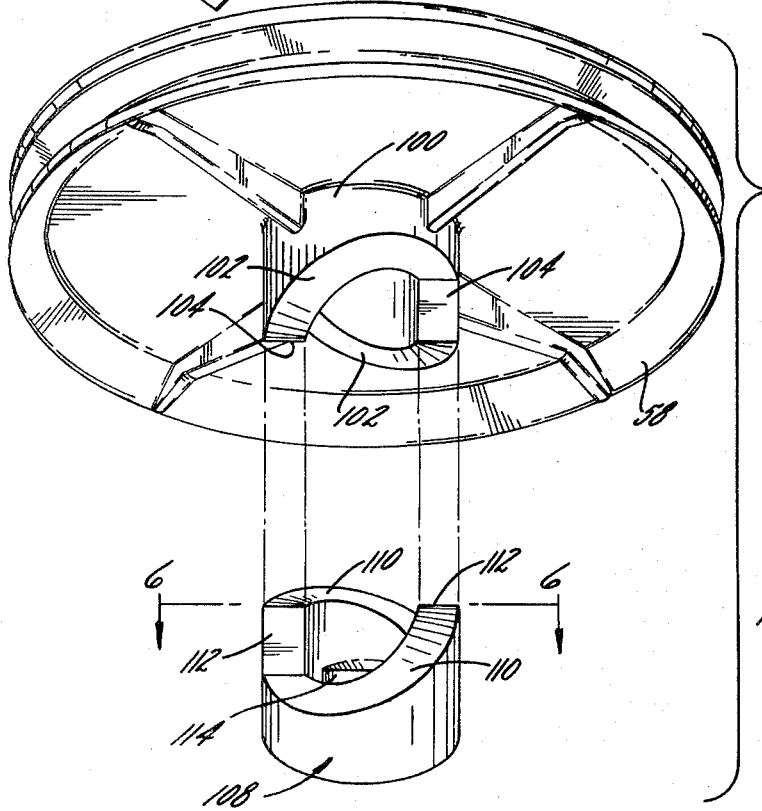
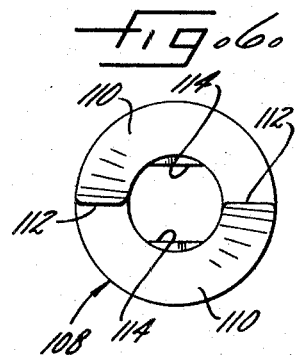

3,838,755

CONICAL SPRING DISK BRAKING MECHANISM

RELATED APPLICATIONS

J. Richard Cochran, Ser. No. 323,761, filed Jan. 15, 1973 for: An improved Laundry Machine Transmission System.

DESCRIPTION OF THE INVENTION

The present invention generally relates to a braking mechanism for use in laundry machines and, more particularly, to a disk braking mechanism for laundry machines of the type having an oscillating agitator for washing clothes and a spin tub for centrifically extracting washing fluid from the clothes.

Many laundry machines commercially available have an oscillating agitator and a spin tub adapted to be rapidly rotated during one or more portions of a washing cycle which is usually denoted as the "spin" portion of the cycle. Laundry machines having such features are typically driven by a reversible electric motor which, when driven in one direction produces the reciprocating rotational movement of the agitator during the washing cycle and the rapid spinning when driven in the opposite direction for centrifically extracting washing fluid from the clothes within the laundry machine. Typically, the spin tub is braked against rotation while the agitator is being rotatively oscillated and is released when the motor is reversed to provide the rapid spinning of the spin tub.

It is an object of the present invention to provide a reliable, economical mechanism for braking the spin tub that is easily fabricated and installed.

Yet another object of the present invention is to provide a small, compact braking mechanism which may reduce the overall size of a laundry machine drive mechanism.

A further object of the present invention is to provide a braking mechanism that is capable of being independently fabricated into a self-contained unit for installation upon the shaft which it is intended to brake.

Still another object of the present invention is to provide a conical spring disk braking mechanism that is easily serviced, in that brake pads may be easily replaced by merely operating the brake mechanism and removing a single bolt holding each of the pads.

Yet another object of the present invention is to provide a braking mechanism that provides a substantial braking force that is not dependent upon the weight of the various components or the like, the braking force being supplied by the conical spring.

Other objects and advantages will become apparent upon reading the attached detailed description and upon reference to the drawings, in which:

FIG. 4 is a top plan view of the braking mechanism embodying the present invention and is taken generally in the direction of line 4—4 of FIG. 3;

FIG. 5 is an exploded perspective view of the drive pulley and cooperating helical washer that are effective to apply or release the braking mechanism of the present invention; and FIG. 6 is a top plan view of the helical washer taken generally in the direction of line 6—6 of FIG. 5.

While the present invention will be described in connection with a preferred embodiment, it should be understood that the intention should not be limited to the particular embodiment shown, but, on the contrary, it is intended to cover the various alternatives and equivalent arrangements included within the spirit and scope of the appended claims.

Figure 1:
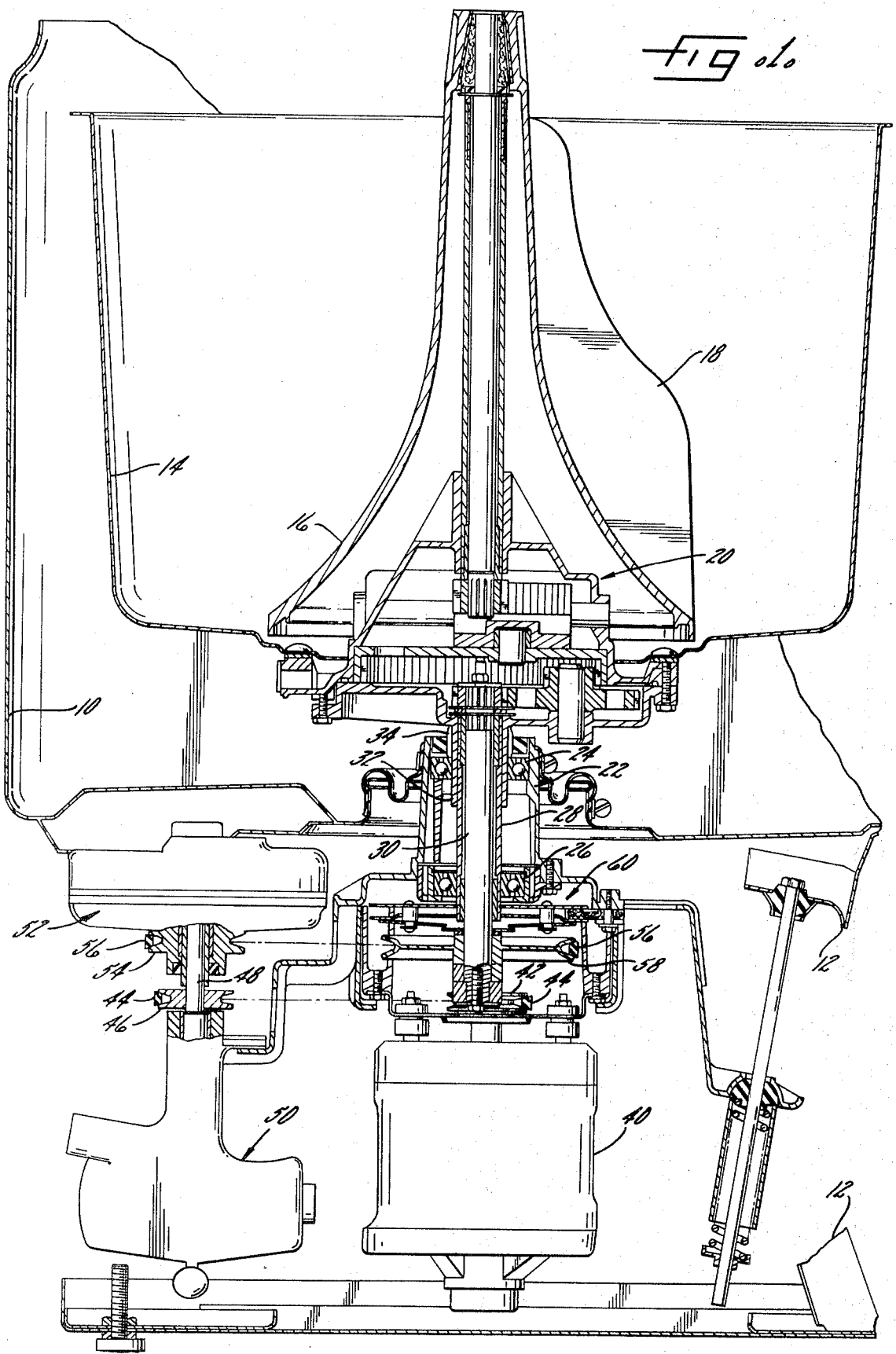
FIG. 1 is a partial elevation of the laundry machine showing the tub, agitator and power train including the braking mechanism embodying the present invention.

Referring to the drawings, and particularly FIG. 1, a laundry machine is illustrated having a vertical tub and agitator, together with a drive mechanism including a braking mechanism embodying the present invention. Broadly stated, the laundry machine has a cylindrical open top drain tub 10 supported by a suitable framework 12. Within the drain tub 10 is an open top cylindrical spin tub 14 that is rotatable about a vertical axis. The particular spin tub 14 illustrated is an imperforate container which is filled with water for washing and rinsing clothes. When it is rapidly rotated or spun, the tub acts as a centrifuge to discharge water over the upper edges into the drain tub 10 and thereby removes excess water from the clothes. Washing is accomplished by a centrally positioned agitator 16 which rotatably oscillates about a vertical axis concentric with the spin axis of the tub 14. As shown, the lower half portion of the agitator 16 is generally conically shaped and may have one or more outwardly extending vertical vanes for moving the water and clothes during oscillation of the agitator.

In a normal cycle of operation, clothes are placed in the spin tub 14 and wash water and detergent are added. The agitator 16 is then rotatively oscillated for a predetermined time to wash the clothes. Thereafter, the spin tub 14 is rotated at high speed to centrifugally extract the wash water. Upon completion of the spinning, rinse water is added, and, if desired, the agitator 16 is restarted. After stopping the agitator again, the tub 14 is again spun to extract the rinse water and upon completion of that end typically completes the cycle of operation and enables the clothes to be removed from the machine.

The present invention is directed to a braking mechanism which is effective to slow down spinning of the spin tub at the end of the spin portion of the washing cycle and to hold the spin tub from rotating during the agitation portion of the normal washing cycle. It should be understood that the invention is not to be limited for use with the particular form of tub and agitator shown or the particular laundry cycle described above, but is capable of use with any spin tub and agitator requiring braking at the termination of the spin portion of the cycle as well as during the agitation portion thereof.

The agitator transmission means, indicated generally at 20, is generally contained within the conical base portion of the agitator 16 and adapted to convert rotational movement of an input shaft to oscillating rotational movement of the agitator, is supported by an upright tubular pedestal 22 having upper and lower bearings 24, 26 in which a spin tube or shaft 28 is journaled.

Interiorly of the spin shaft 28 in coaxial relation is an agitator input shaft 30 which is adapted to be rotated independently of the spin shaft 28 for the purpose of producing oscillating movement of the agitator 16. The nature of the operation of the agitator transmission driven by the input shaft 30 will not be described herein, a full and comprehensive description being contained within the above cross-referenced application of Cochran entitled An Improved Laundry Machine Transmission System. The outer spin shaft 28 is secured to a lower cylindrical portion 32 of the housing of the agitator 20, the cylindrical portion engaging the upper bearings 24 so that during spinning of the spin tub 14, the spin shaft 28, the cylindrical portion 32 of the agitator transmission housing as well as the complete agitator transmission 20 and agitator 16 are rotated. The tubular pedestal 22 has an annular bushing 34 that is adapted to contact the underside of the transmission casing in supporting relation.

To drive the spin tub 14 and agitator 16, a reversible electric motor 40 is provided, its output shaft having a pulley 42 driving a belt 44 that is also carried by a second pulley 46 attached to a shaft 48 of a pump 50 as well as a fluid drive 52. The fluid drive has an output drive pulley 54 carrying a belt 56 which is also carried by a drive pulley 58 that is adapted to drive the spin shaft or agitator transmission, depending upon the direction in which it is rotated.

Briefly stated, when the motor 40 is operating in a clockwise direction as viewed from beneath the motor, the pulleys 46, 54 and 58 will also be driven in a clockwise direction which results in spinning of the spin tub. When the motor is driven in the opposite direction, causing the pulleys 46, 54 and 58 to be driven in a counterclockwise direction, the agitator will be rotatively oscillated with the spin tub held against rotation.

When the pulley 58 is being driven in the counterclockwise direction causing rotational oscillation of the agitator 16, the spin shaft 28 is held to prohibit rotation thereof by a braking mechanism indicated generally at 60. When the pulley 58 is driven in a clockwise direction for operation in the spin mode, the braking mechanism 60 is released, enabling the spin tub 14, the agitator transmission 20 including its input shaft 30 to rotate until the spin cycle is terminated. As soon as the pulley 58 is rotated in a counterclockwise direction relative to the clockwise rotating spin shaft 28, the brake mechanism 60 will be reapplied and will quickly stop the rotating spin tub and spin shaft 28.

Figure 2:
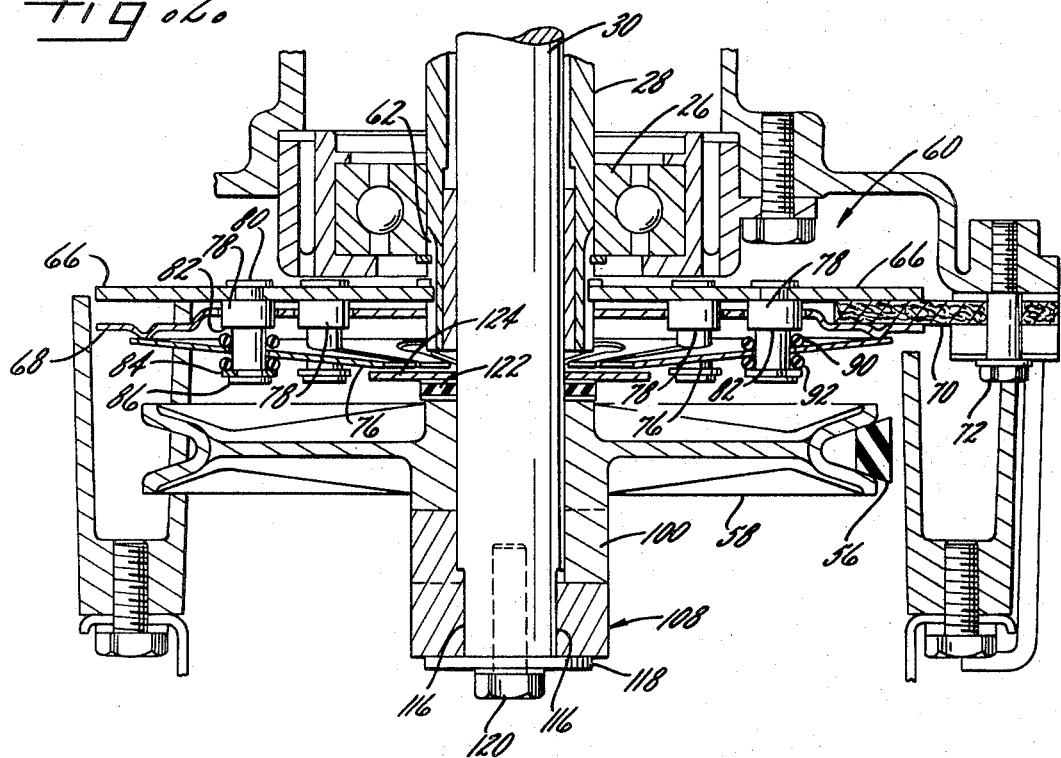
FIG. 2 is an enlarged partial elevation of the laundry machine shown in FIG. 1, particularly illustrating the braking mechanism embodying the present invention shown in its applied or braking mode.
Figure 3:
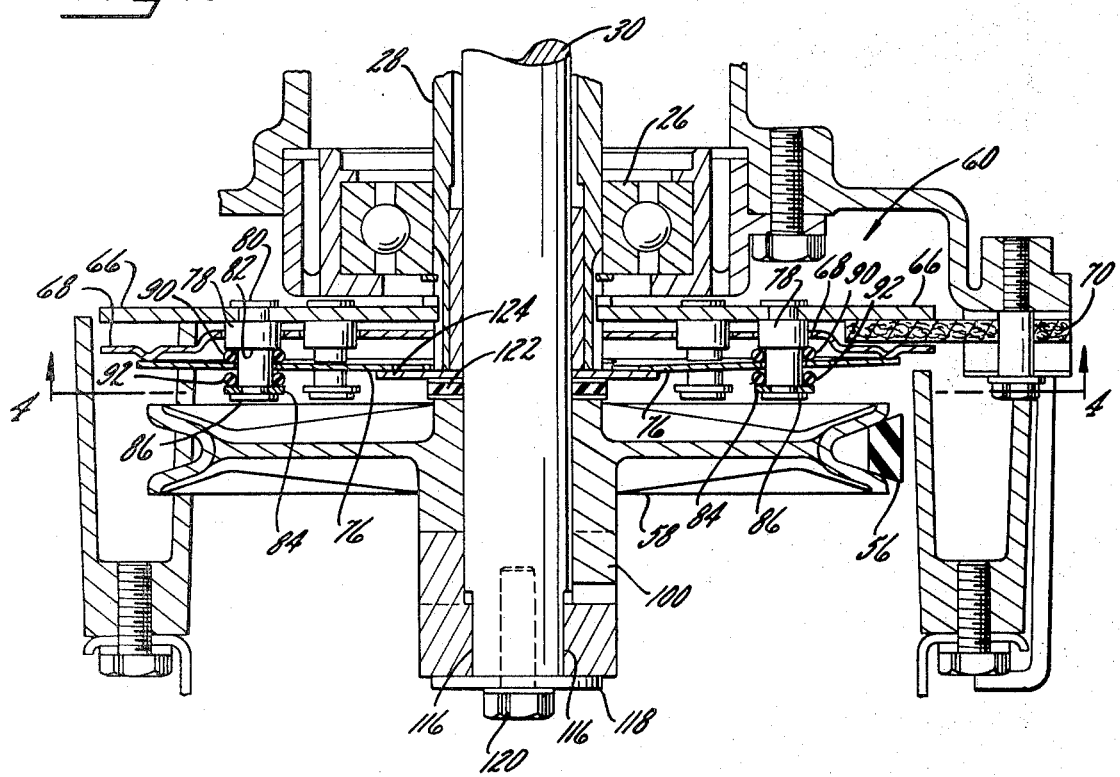
FIG. 3 is a partial view similar to FIG. 2, but illustrating the braking mechanism while in its released or non-braking mode.

In accordance with an important aspect of the present invention, the braking mechanism 60 is actuated by the drive pulley 58 which, by virtue of the direction in which it is rotated, is caused to move axially relative to the input shaft 30 carrying it. FIGS. 2 and 3 illustrate the braking mechanism embodying the present invention in enlarged fashion together with the drive pulley 58 and other of the associated components of the machine. FIGS. 2 and 3 differ from one another only to the extent that they show the braking mechanism in an applied and released condition, FIG. 2 illustrating the braking mechanism applying braking force, while FIG. 3 shows the brake released as would occur during the spin portion of a washing cycle.

In accordance with an important aspect of the present invention, a brake mechanism 60 may be relatively easily constructed from a minimum number of components and may be fabricated into a self-contained unit that is thereafter incorporated into the laundry machine. The braking mechanism 60 is adapted to be attached to the spin shaft 28, the lower end of which is provided with a number of axially aligned splines 62 that are engageable with the serrated central opening 64 of a flat plate 66 (see FIG. 4). Adjacent the plate 66 is a second plate 68 that is capable of being moved axially relative to the plate 66. It is this relative movement between the two plates which effectively applies or releases braking force by compressing one or more brake pads to be positioned between them. Referring to FIGS. 2-4, it is shown that a total of three brake pads 70 are incorporated into the mechanism, the pads 70 being removably secured to the frame structure of the laundry machine by threaded bolts 72 or the like. Since the brake pads 70 extend between the plates 66, 68 and inwardly beyond their outer peripheries, it should be understood that when the plates are forcibly urged toward one another to contact the brake pads 70, braking forces will be generated which will inhibit movement of the plate 66 and therefore the spin shaft 28 to which it is attached. It is also apparent from FIG. 3, that when the plate 68 is moved away from the plate 66, the braking force will be released and both plates will be free to rotate relative to the fixed pads 70, which occurs during the spin portion of the washing cycle.

To generate the force for pressing the plate 68 toward the plate 66 to compress the brake pads and produce the braking force, the mechanism embodying the present invention utilizes a conical spring 76 which is adjacent to and in contact with the plate 68. The spring, however, is attached to the plate 66 by a number of holding spacers 78, which in the illustrated embodiment of FIG. 2 are shown to be rivets having an enlarged center portion. As best shown in FIG. 4, a total of eight of the holding spacers 78 are generally equally spaced in a circle that is concentric with and generally midway between the inner and outer peripheries of the conical spring. The circle defined by the spacers 78 form an annular fulcrum over which the conical spring acts, the spring being shaped such that it normally applies a force urging the plate 68 toward the plate 66 to thereby generate a braking force against the brake pads 70 under normal conditions. Thus, the outer periphery of the conical spring tends to push against the plate 68 by virtue of the force of the spring acting on the lower side of the holding spacers 78. The purpose of the enlarged center portion in each of the rivets 78 is to provide opposed annular flat surfaces for securing the rivet to the plate 66, since all that is required to secure the rivet thereto is to insert the smaller diameter portion through an opening in the plate 66 and thereafter flatten the portion extending through the opening to form a head 80 that rigidly holds the rivet 78 in place. The opposite flat annular surface 82 similarly defines a supporting surface for holding the conical spring 76, the lower end portion of the rivet extending through suitable openings in the conical spring so that after placement of a washer 84 or the like, and flattening the lower end portion to similarly form another head 86. Thus, the rivets 78, plates 66 and 68 as well as the conical spring 78 are all fastened together in a self-contained unit. It should be understood, however, that the conical spring is free to be deflected and the lower plate 68 is free to move relative to the fixed plate 66 that is attached to the spin shaft 28.

Although a total of eight spacers 78 have been shown in the drawings for the particular illustrated embodiment, it should be understood that a greater or lesser number could be used. The intention is to provide a generally even distribution of force on the conical spring so that during operation, the spring will exert a generally uniform braking force on the pads during rotation and will generally uniformly deflect when the brake mechanism is released. The number of spacers 78 is, at least in part, determinative of the uniform deflection of the conical spring when the brake mechanism is operated.

To assure a more uniform application of braking force and deflection of the spring during operation of the mechanism, a pair of wire ring members 90 and 92 are also provided and extend around the outside of the rivets 78, with the wire ring 90 being positioned between the land surface 82 of the rivet 78 and the conical spring 76, the wire ring 92 being positioned between the conical spring and the washer 84. The pressure of the wire rings is effective to more equally distribute the forces being applied on the annular fulcrum during operation of the braking mechanism, in contrast to the eight isolated areas where the rivets 78 are located.

To operate the braking mechanism, the inner periphery of the conical spring is moved toward and away from the plate 66, which causes the outer periphery to release and apply force upon the movable plate 68 and thereby increase or decrease braking force being applied to the brake pads 70. By moving the inner periphery of the conical spring toward the fixed plate 66, the outer periphery will be caused to move away from the movable plate 68 because of the presence of the described annular fulcrum. When the inner periphery is not deflected inwardly toward the plate 66, the force of the spring will urge the movable plate 68 toward the stationary plate 66 by the reaction of the spring against the annular fulcrum and particularly the ring 92. Thus, the braking mechanism 60 will normally apply a braking force to the brake pads 70 tending to prohibit movement of the spin shaft 28 unless the mechanism is operated by depressing the inner periphery of the conical spring toward the stationary plate 66.

As is best seen in FIG. 4, the conical spring 76 has a number of radially extending slots that extend from the inner periphery to generally the location of the annular fulcrum. The radial slots permit the spring to be more easily deflected, since the elongated strips between adjacent slots are adapted to function as levers for deflecting the solid outer portion of the conical spring. It should be understood that a substantially greater force would be required to depress the inner periphery of the spring if the slots were not present. Additionally, a conical spring capable of generating a given amount of force may be used, the strips permitting the spring to be actuated or deflected with a lesser amount of force. Thus, a spring having greater strength may be used with a lesser available actuating force and may accordingly be more compatable with the characteristics of the actuating mechanism existing in the machine.

To actuate the brake mechanism 60, the drive pulley 58 has a hub portion 100, as shown in FIGS. 2, 3 and 5, that contains a pair of inclined helical surfaces 102, each of which extend through an arc of about 180° and terminate in a flat, generally perpendicular surface 104. The pulley 58 is free to move relative to the agitator input shaft 30 upon which it is journaled and, accordingly, may be rotatively as well as axially moved relative to it. Cooperating with the helical surfaces 102 of the pulley 58 is a stationary washer 108 that has a pair of helical inclined surfaces 110 terminating in flat perpendicular portions 112, which cooperate with the respective helical and flat surfaces of the pulley 58. The washer also has internal flat surfaces 114 cooperating with flat surfaces 116 on the agitator input shaft 30 to prevent rotational movement of the washer. The helical washer 108 is simply slid upon the end of the shaft 30 and is held intact by a flat washer 118 and bolt 120 that is threadably inserted into an appropriate threaded aperture in the end of the shaft 30.

As previously mentioned, rotation of the pulley 58 in the counterclockwise direction as viewed from below it is effective to cause rotational oscillation of the agitator 16 during the washing cycle. When the pulley 58 is being driven in the counterclockwise direction, the brake mechanism 60 will be applied to prevent rotation of the spin shaft 28 and such condition is shown in FIG. 2. When the pulley is rotated in the counterclockwise direction, the flat surfaces 104 of the pulley 58 engage the flat surfaces 112 of the helical washer 108 and, accordingly, drive the agitator input shaft 30 in the counterclockwise direction as desired. When driven in this direction, the pulley 58 will remain in its position spaced away or apart from the braking mechanism 60 and the brake mechanism will be in its braking mode.

To release the brake mechanism 60 which would be necessary for operating in the spin portion of the washing cycle, the pulley 58 is reversed in its direction of rotation so as to rotate in a clockwise direction as viewed from beneath it. This causes relative movement between the pulley 58 and the helical washer 108 causing the pulley to climb or ride up the shaft 30 since the helical surfaces 102, 110 will move relative to one another. By virtue of the pulley 58 being rotated in the clockwise direction causing it to move toward the brake mechanism 60, it will cause the brake mechanism to be released by virtue of the contact between the pulley 58, needle bearing 122, & flat washer 124 which depress or deflect the inner periphery of the conical spring 76. The pulley 58 will continue to climb the washer 108 until further movement is restricted due to contact of the washer 124 with the end of the spin shaft 28. The brake mechanism 60 is shown in FIG. 3 with the conical spring in a substantially flat deflected position and the washer 124 contacting the end of the spin shaft 28 so that it may be driven for continuation of the spin cycle with the brake mechanism 60 in its released mode. The high speed rotation of the spin tub agitator and agitator transmission may be continued for the preselected period of time in accordance with the control sequence of the laundry machine. When the spin portion of the washing cycle is to be terminated, the pulley 58 is deliberately slowed down, which will cause it to move counterclockwise relative to the spin shaft 28 since the spin tub and the clothes within it will have considerable angular momentum. Thus, slowing of the pulley 58 will cause relative movement between the spin tub and the pulley which will cause the pulley to retract and move down the helical washer 108 and thereby permit the conical spring to gradually reapply force to the plate 68 and thereby apply braking force to the brake pads 70 and terminate the spinning of the spin shaft 28.

Thus, an improved braking mechanism has been shown and described which represents a significant improvement over many preexisting braking mechanisms for laundry machines or the like. It should be understood that the brake mechanism is easily serviced in terms of changing brake linings or pads, since all that is required is to rotate the pulley 58 to release the application of braking force and thereafter remove the bolts 72 holding the brake pads 70 in place and insert new pads in place of the old ones. Such an operation may be easily performed in a relatively short time and virtually no other adjustment is required. The braking mechanism has the further advantage in that it can be completely fabricated in an integral unit and may then be easily placed on the spin shaft 28 during production of the laundry machine. The brake mechanism embodying the present invention has the additional desirable attribute of supplying a substantial braking force that is not dependent upon the weight of components of the machine, the braking force largely being a function of the strength of the conical spring 76. It is believed that the braking mechanism embodying the present invention satisfies all of the objects and advantages that have been previously described.

We claim:

1. A disk braking mechanism for use on a rotating shaft, comprising:

first and second generally circular plates adapted to be axially movable relative to one another to engage one or more stationary braking pads positioned therebetween, said first plate being rigidly affixed to said shaft;

a conical spring positioned adjacent said second plate such that the outer periphery of the spring normally contacts and urges said second plate toward said first plate to apply braking force to said pads;

a number of holding spacers aligned in a circle concentric with and generally midway between the inner and outer peripheries of said spring, said holding spacers being attached to said first plate and extending through openings in said second plate and said spring and adapted to hold said spring, said spacers defining a generally annular fulcrum over which said spring may be deflected, said deflection occurring by depressing the inner periphery of said spring, causing the outer periphery to thereby reduce the force being applied to said second plate and to the brake pads positioned between said first and second plates.

2. A disk braking mechanism as defined in claim 1 wherein said conical spring has a number of radially directed slots extending from the inner periphery to the annular fulcrum.

3. A disk braking mechanism as defined in claim 1 wherein said holding spacers comprise rivets, one end portion of which is rigidly secured to said first plate and extends outwardly therefrom, the opposite end portion thereof having a reduced diameter so as to define an annular land surface for holding said conical spring, the reduced diameter of said opposite end portion terminating in a flattened head to hold said conical spring.

4. A disk braking mechanism as defined in claim 3 including a wire ring positioned between said conical spring and said land area of each of said rivets, said wire ring extending around all of said rivets and defining a generally uniform annular fulcrum over which said spring may be deflected.

5. A disk braking mechanism as defined in claim 4 including a second annular wire ring positioned between said conical spring and said flattened head of each of said rivets, said second wire ring being on the opposite side of said conical spring from said first wire ring.

6. A disk braking mechanism as defined in claim 1 wherein said first plate is of sufficient thickness and strength to support said spacers without distorting during deflection of the spring.

7. A disk braking mechanism as defined in claim 1 wherein said second plate is positioned beneath said first plate so that upon depression of the inner periphery of said conical spring to reduce the force being applied to the second plate, the force of gravity on said second plate will cause it to move away from said first plate and therefore said brake pads.

8. A disk braking mechanism as defined in claim 1 wherein the inside diameter of said conical spring and said second plate is substantially greater than the inside diameter of said first plate so that said conical spring and second plate will be free to move without interference from said shaft.

9. A disk braking mechanism as defined in claim 1 including three relatively flat brake pads are generally equally spaced around the outer periphery of said circular plates.

10. A disk braking mechanism for use in a laundry machine having a vertical spin tub driven by a rotatable shaft, said shaft being journalled in bearings carried by a support structure, the mechanism comprising:

a first generally circular plate fixed to said shaft;

a second generally circular plate adjacent said first plate and adapted to be axially movable relative to said first plate and said shaft;

a number of relatively thin brake pads removably fixed to said support structure and extending inwardly of the outer peripheries of said first and second circular plates and positioned between the plates, said plates being rotatable relative to said pads when said plates are separated from one another a distance greater than the thickness of the pads;

a conical spring positioned adjacent said second plate, the outer periphery thereof adapted to contact the outer peripherial portion of the second plate and urge the same toward said pads and first plate to normally apply a compressive force on said pads and inhibit rotational movement of said shaft;

a number of holding spacers generally equally spaced in a circle concentric with and generally midway between the inner and outer peripheries of said spring, the spacers being rigidly affixed to said first plate and extending through openings in said second plate and spring, the outer end portion of the spacers being of reduced diameters to define a land area for holding the spring in spaced relation from said first plate and terminating in an expanded end for holding the spring to said spacers, said spacers together defining a generally annular fulcrum over which said spring may be deflected, said deflection occurring by depressing the inner periphery of said spring, thereby causing the outer periphery to move away from the second plate and reduce the compressive force on the pads.

11. A disk braking mechanism as defined in claim 10 wherein said spacers comprise rivets having a central portion of a predetermined diameter and end portions with a reduced diameter and annular land areas where said central portion meet the end portions having the reduced diameter.

12. A disk braking mechanism as defined in claim 11 wherein said second plate has openings slightly larger than the diameter of said center portion of the rivets to enable movement relative to said first plate and said shaft.

* * * * *